(12) United States Patent
Carmichael et al.

(10) Patent No.: US 12,475,596 B2
(45) Date of Patent: Nov. 18, 2025

(54) SYSTEM FOR OPERATING A MOVABLE DEVICE

(71) Applicant: Ford Global Technologies, LLC, Dearborn, MI (US)

(72) Inventors: Spencer Carmichael, Ann Arbor, MI (US); Ramanarayan Vasudevan, Ann Arbor, MI (US); Katherine Skinner, Ann Arbor, MI (US); Rahul Kumar Agrawal, Ann Arbor, MI (US); Alexandra Carlson, Palo Alto, CA (US); Gaurav Pandey, College Station, TX (US); Mostafa Parchami, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 18/344,027

(22) Filed: Jun. 29, 2023

(65) Prior Publication Data

US 2025/0005789 A1     Jan. 2, 2025

(51) Int. Cl.
*G06T 7/73* (2017.01)

(52) U.S. Cl.
CPC ...... *G06T 7/74* (2017.01); *G06T 2207/10012* (2013.01); *G06T 2207/10028* (2013.01); *G06T 2207/30244* (2013.01)

(58) Field of Classification Search
None
See application file for complete search history.

(56) References Cited

U.S. PATENT DOCUMENTS

| 9,464,894 B2 | 10/2016 | Napier et al. |
| 2020/0218259 A1* | 7/2020 | Parchami ............ G05D 1/0088 |
| 2021/0065563 A1 | 3/2021 | Bauer et al. |
| 2021/0335831 A1 | 10/2021 | Matsusaki et al. |

(Continued)

OTHER PUBLICATIONS

Garg et al., "Look No Deeper: Recognizing Places from Opposing Viewpoints under Varying Scene Appearance using Single-View Depth Estimation", Conference Paper • May 2019 DOI: 10.1109/ICRA.2019.8794178.

(Continued)

*Primary Examiner* — Xiaolan Xu
(74) *Attorney, Agent, or Firm* — Frank A. MacKenzie; Brooks Kushman P.C.

(57) ABSTRACT

A computer that includes a processor and a memory, the memory including instructions executable by the processor to generate a current keyframe point cloud based on pairs of stereo images while a stereo camera travels through a scene to determine a similar viewpoint query matrix and an opposing viewpoint query matrix based the current keyframe point cloud. A distance matrix and an opposing view distance matrix can be generated by comparing the similar viewpoint query matrix and the opposing viewpoint query matrix to reference matrices. A relative pose between a stereo camera and a reference can be determined to determine a location in the scene during travel of the stereo camera through the scene by performing sequence matching in the distance matrix and the opposing view distance matrix to determine a minimum sequence.

20 Claims, 11 Drawing Sheets

(56) References Cited

U.S. PATENT DOCUMENTS

2022/0100995 A1    3/2022  Loveland et al.
2024/0164874 A1*   5/2024  Lipnik ................ A61C 9/0053

OTHER PUBLICATIONS

Kim, "Scan Context++: Structural Place Recognition Robust to Rotation and Lateral Variations in Urban Environments", arXiv:2109.13494v1 [cs.RO] Sep. 28, 2021.

Pepperell et al., "All-Environment Visual Place Recognition with SMART", 2014 IEEE International Conference on Robotics & Automation (ICRA) Hong Kong Convention and Exhibition Center May 31-Jun. 7, 2014. Hong Kong, China.

Mo et al., "Extending Monocular Visual Odometry to Stereo Camera Systems by Scale Optimization", arXiv:1905.12723v3 [cs.CV] Sep. 17, 2019.

* cited by examiner

SYSTEM FOR OPERATING A MOVABLE DEVICE

BACKGROUND

Computers can operate systems and/or devices including vehicles, robots, drones, and/or object tracking systems. Data including images can be acquired by sensors and processed using a computer to determine a location of a system with respect to objects in an environment around the system. A computer may use the location data to determine trajectories for moving a system in the environment. The computer can then determine control data to transmit to system components to control system components to move the system according to the determined trajectories.

DETAILED DESCRIPTION

Figure 1:
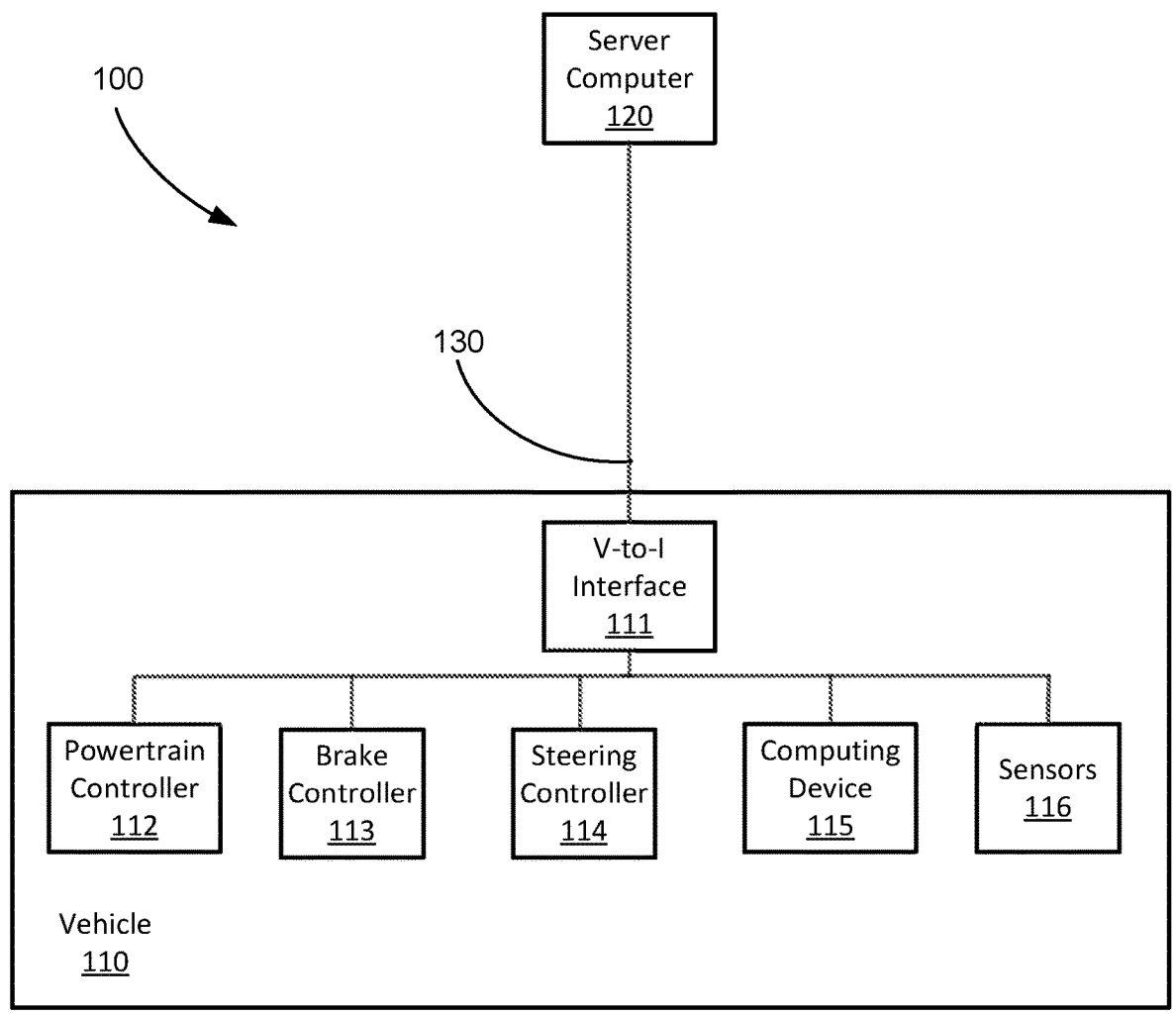
FIG. 1 is a block diagram of an example vehicle system.

Systems including vehicles, robots, drones, etc., can be operated by acquiring sensor data regarding an environment around the system and processing the sensor data to determine a location of the system in real world coordinates. The determined real world location data can be processed to determine a path upon which to operate the system or portions of the system. For example, a robot can determine the location of a gripper attached to a robotic arm with respect to a conveyer belt. The determined location can be used by the robot to determine a path upon which to operate to move portions of the robot to grasp the workpiece. A vehicle can determine a location of the vehicle with respect to a roadway. The vehicle can use the determined location to operate the vehicle from a current location to a planned location while maintaining a predetermined distance from the edges of the roadway. Vehicle operation will be used as a non-limiting example of system location determination herein, Determining a location of a vehicle based on image data is referred to in the context of this document as visual place recognition (VPR). VPR uses image data to determine whether the current place is included in a pre-existing set or database of reference locations. VPR can include at least two different types of reference databases. The first can be multi-session reference database, where the database of references is pre-existing and possibly georeferenced. Georeferencing refers to examples where global navigation satellite system (GNSS) data, optionally combined with inertial measurement unit (IMU) data, is used to generate a database of 3D locations that includes real world coordinates. The second can be an in-session reference database, where the reference database of 3D locations is determined by the vehicle based on previous locations visited in a contiguous driving session. An in-session reference database may or may not be georeferenced. Non-georeferenced databases can provide a relative pose between a camera and a reference database of 3D locations. For example, a current camera location can be determined relative to the camera's location when it was first turned on. Georeferenced databases provide absolute localization where a location can be determined relative to a global reference frame. For example, the vehicle location can be determined in terms of latitude and longitude.

An example of VPR described herein includes determining the location of a vehicle as it returns along a route that has been determined based on data collected by a vehicle traveling in the opposite direction. This is referred to herein as VPR based on opposing viewpoints. Existing techniques for determining VPR for opposing viewpoints include forward and backward (360°) cameras or multiple cameras with wide field of view lenses, e.g., fisheye cameras or lidar sensors. Other VPR techniques rely on semantic segmentation of scenes using deep neural networks. Semantic segmentation refers to techniques which identify and locate objects such as buildings and roadways. Employing a deep neural network to perform semantic segmentation can require determining extensive object label data for training the deep neural network. Techniques described herein for VPR for opposing viewpoints enhance VPR by determining vehicle location based on limited field of view (e.g., 180°) stereo cameras. Using limited field of view stereo cameras reduces system complexity and the amount of computing resources including memory required by 360° cameras, fisheye cameras or lidar sensors. VPR for opposing viewpoint techniques described herein can eliminate the need for training data and reduce the computing resources required over deep neural network solutions.

VPR for opposing viewpoints enhances the ability of VPR to determine vehicle locations despite traveling on a route in the opposite direction from the direction in which the reference database was acquired. Techniques described herein for VPR can additionally operate with references collected under similar viewpoints, without need for prior knowledge regarding the reference viewpoint. An example of VPR for opposing viewpoints enhancing vehicle operation can be examples where, due to interference from tall buildings, GNSS data is temporarily not available. VPR for opposing viewpoints can locate a vehicle with respect to a previously acquired georeferenced reference database and permit operation of a vehicle despite missing GNSS data.

A method is disclosed herein, including generating a current keyframe point cloud based on pairs of stereo images while a stereo camera travels through a scene, determining a similar viewpoint query matrix and an opposing viewpoint query matrix based on the current keyframe point cloud, and generating a distance matrix and an opposing view distance matrix by comparing the similar viewpoint query matrix and the opposing viewpoint query matrix to reference matrices. A relative pose can be determined between a stereo camera and a reference to determine a location in the scene during travel of the stereo camera through the scene by performing sequence matching in the distance matrix and the opposing view distance matrix to determine a minimum sequence. The keyframe point cloud can be generated based on the pairs of stereo images by projecting pixel data from the pairs of stereo images into the keyframe point cloud based on a pose estimate for the stereo camera and camera intrinsic parameters from one or more of a left or right camera of the stereo camera. The similar viewpoint query matrix and the opposing viewpoint query matrix can be determined based on data points included in the current keyframe point cloud and distances above a ground plane of the data points.

The similar viewpoint query matrix can be arranged in columns that are parallel to a direction of motion of the stereo camera and rows that are perpendicular to the direction of motion of the stereo camera. The opposing viewpoint query matrix can be determined by flipping the similar viewpoint query matrix laterally and longitudinally by exchanging opposing rows and columns of the similar viewpoint query matrix. The similar viewpoint query matrix and the opposing viewpoint query matrix can be compared to the reference matrices to generate similar view distance matrix columns and opposing view distance matrix columns by shifting the similar viewpoint query matrix and the opposing viewpoint query matrix laterally and longitudinally with respect to the reference matrices and comparing overlapping bin values.

Sequence matching can be performed on the similar view distance matrix columns and the opposing view distance matrix columns by searching for diagonals that include minimum values that indicate matches. The reference keyframes can be generated by traveling in the scene in a first direction while acquiring pairs of stereo images and generating the reference keyframes at equal displacements of the stereo camera. A real world location in the scene determined during the travel of the stereo camera through the scene can be generated based on a georeferenced reference database. A vehicle can be operated based on the location in the scene by determining a path polynomial. A pose estimate and a depth image can be determined based on the stereo images using stereo visual odometry. The elements of distance matrices can be determined as a minimum cosine distance between flattened overlapping patches of the similar viewpoint query matrix and the opposing viewpoint query matrix and the reference matrices. The cosine distance can be determined by the equation $1-(a \cdot b)/(\|a\|\|b\|)$. Diagonals of distance matrices that include minimum values that indicate matches have a slope magnitude approximately equal to $+/-1$.

Further disclosed is a computer readable medium, storing program instructions for executing some or all of the above method steps. Further disclosed is a computer programmed for executing some or all of the above method steps, including a computer apparatus, programmed to generate a current keyframe point cloud based on pairs of stereo images while a stereo camera travels through a scene, determine a similar viewpoint query matrix and an opposing viewpoint query matrix based on the current keyframe point cloud, and generate a distance matrix and an opposing view distance matrix by comparing the similar viewpoint query matrix and the opposing viewpoint query matrix to reference matrices. A relative pose can be determined between a stereo camera and a reference to determine a location in the scene during travel of the stereo camera through the scene by performing sequence matching in the distance matrix and the opposing view distance matrix to determine a minimum sequence. The keyframe point cloud can be generated based on the pairs of stereo images by projecting pixel data from the pairs of stereo images into the keyframe point cloud based on a pose estimate for the stereo camera and camera intrinsic parameters from one or more of a left or right camera of the stereo camera. The similar viewpoint query matrix and the opposing viewpoint query matrix can be determined based on data points included in the current keyframe point cloud and distances above a ground plane of the data points.

The instructions can include further instructions where the similar viewpoint query matrix can be arranged in columns that are parallel to a direction of motion of the stereo camera and rows that are perpendicular to the direction of motion of the stereo camera. The opposing viewpoint query matrix can be determined by flipping the similar viewpoint query matrix laterally and longitudinally by exchanging opposing rows and columns of the similar viewpoint query matrix. The similar viewpoint query matrix and the opposing viewpoint query matrix can be compared to the reference matrices to generate similar view distance matrix columns and opposing view distance matrix columns by shifting the similar viewpoint query matrix and the opposing viewpoint query matrix laterally and longitudinally with respect to the reference matrices and comparing overlapping bin values. Sequence matching can be performed on the similar view distance matrix columns and the opposing view distance matrix columns by searching for diagonals that include minimum values that indicate matches. The reference keyframes can be generated by traveling in the scene in a first direction while acquiring pairs of stereo images and generating the reference keyframes at equal displacements of the stereo camera. A real world location in the scene determined during the travel of the stereo camera through the scene can be generated based a georeferenced reference database. A vehicle can be operated based on the real world location in the scene by determining a path polynomial. A pose estimate and a depth image can be determined based on the stereo images using stereo visual odometry. The elements of distance matrices can be determined as a minimum cosine distance between flattened overlapping patches of the similar viewpoint query matrix and the opposing viewpoint query matrix and the reference matrices. The cosine distance can be determined by the equation $1-(a \cdot b)/(\|a\|\|b\|)$. Diagonals of distance matrices that include minimum values that indicate matches have a slope magnitude approximately equal to $+/-1$.

FIG. 1 is a diagram of a vehicle computing system 100. Vehicle computing system 100 includes a vehicle 110, a computing device 115 included in the vehicle 110, and a server computer 120 remote from the vehicle 110. One or more vehicle 110 computing devices 115 can receive data regarding the operation of the vehicle 110 from sensors 116. The computing device 115 may operate the vehicle 110 based on data received from the sensors 116 and/or data received from the remote server computer 120. The server computer 120 can communicate with the vehicle 110 via a network 130.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (i.e., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, i.e., via a vehicle communications bus as described further below, more than one computing devices, i.e., controllers or the like included in the vehicle 110 for monitoring and/or controlling various vehicle components, i.e., a propulsion controller 112, a brake controller 113, a steering controller 114, etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in the vehicle 110 and/or receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V2I) interface 111 with a remote server computer 120, i.e., a cloud server, via a network 130, which, as described below, includes hardware, firmware, and software that permits computing device 115 to communicate with a remote server computer 120 via a network 130 such as wireless Internet (WI-FI®) or cellular networks. V2X interface 111 may accordingly include processors, memory, transceivers, etc., configured to utilize various wired and/or wireless networking technologies, i.e., cellular, BLUETOOTH®, Bluetooth Low Energy (BLE), Ultra-Wideband (UWB), Peer-to-Peer communication, UWB based Radar, IEEE 802.11, and/or other wired and/or wireless packet networks or technologies. Computing device 115 may be configured for communicating with other vehicles 110 through V2X (vehicle-to-everything) interface 111 using vehicle-to-vehicle (V-to-V) networks, i.e., according to including cellular communications (C-V2X) wireless communications cellular, Dedicated Short Range Communications (DSRC) and/or the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V2I) interface 111 to a server computer 120 or user mobile device 160.

As already mentioned, generally included in instructions stored in the memory and executable by the processor of the computing device 115 is programming for operating one or more vehicle 110 components, i.e., braking, steering, propulsion, etc., without intervention of a human operator. Using data received in the computing device 115, i.e., the sensor data from the sensors 116, the server computer 120, etc., the computing device 115 may make various determinations and/or control various vehicle 110 components and/or operations. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a propulsion controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more propulsion controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, i.e., a passenger car, light truck, etc. The vehicle 110 includes one or more sensors 116, the V2I interface 111, the computing device 115 and one or more controllers 112, 113, 114. The sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Server computer 120 typically has features in common, e.g., a computer processor and memory and configuration for communication via a network 130, with the vehicle 110 V2I interface 111 and computing device 115, and therefore these features will not be described further to reduce redundancy. A server computer 120 can be used to develop and train software that can be transmitted to a computing device 115 in a vehicle 110.

Figure 2:
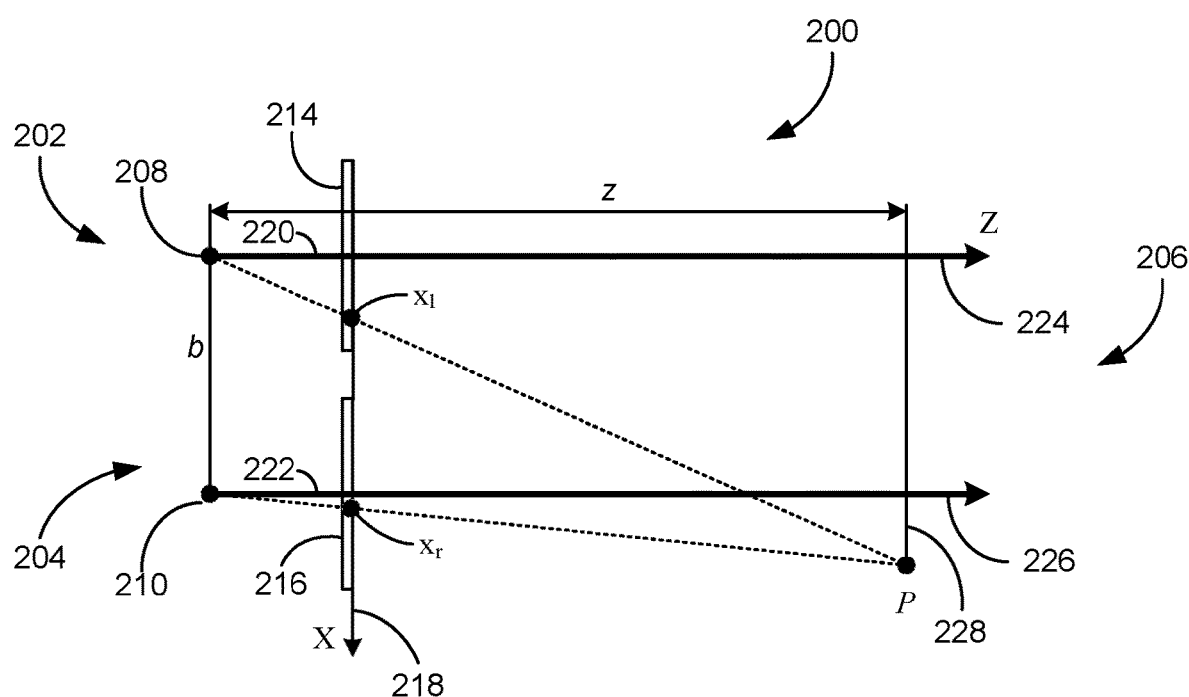
FIG. 2 is a diagram of an example stereo camera.

FIG. 2 is a diagram of a stereo camera 200. Stereo camera 200 can acquire data that can be processed by computing device 115 to determine distances to locations in the field of view of the stereo camera 200 for input to a VPR system. Determining a vehicle location based on locations in the field of view of a camera is referred to as visual odometry. Visual odometry uses image data to estimate an environment surrounding the camera and determine the camera's trajectory within that structure/environment. Stereo camera 200 generates a point cloud of three-dimensional (3D) locations that can be used to determine and locations for objects in the environment around vehicle 110 and a location for vehicle 110 with respect to those objects. A VPR system can use depth data generated by visual odometry to determine a best match between acquired point cloud data points and data points in a previously acquired 3D map of the environment in which the vehicle 110 is traveling. The 3D map data points can be determined by traveling a route and acquiring stereo camera 200 point cloud data points and assembling them into a 3D map. The VPR system can determine the location of the stereo camera 200 with respect to the 3D map. In examples where the locations included in the 3D map are georeferenced and are known in real world coordinates, the VPR system can determine the location of the stereo camera in real world coordinates.

Stereo camera 200 includes a left camera 202 and a right camera 204, both configured to view a scene 206. Left camera 202 and right camera 204 each include an optical center 208, 210, respectively. Left camera 202 and right camera 204 can be configured to view the scene 206 along parallel optical axes 224, 226, respectively. The optical axes 224, 226 and the sensor plane 218 can be configured to be perpendicular, forming the z and x axes. The x axis can be defined to pass through the optical center 208 of one of the stereo cameras 202, 204. The y axis is in the direction perpendicular to the page. The sensor plane 218 includes the left image sensor 214 and right image sensor 216 included in left camera 202 and right camera 204, respectively. The optical centers 208, 210 are separated by a baseline distance b. Left image sensor 214 and right image sensor 216 are located in the sensor plane 218 at focal distance 220, 222 from optical centers 208, 210, respectively. The left and right image sensors 214, 216 are illustrated as being in the virtual image plane, e.g., in front of the optical centers 208, 210 for ease of illustration. In practice the left and right image sensors 214, 216 would be behind the optical centers 208, 210, e.g., to the left of the optical centers 208, 210 in FIG. 2.

Stereo camera 200 can be used to determine a depth z from a plane defined with respect to the optical centers 208, 210 of left and right cameras 202, 204, respectively to a point P in scene 206. Point P is a distance $x_p$ 228 from right optical axis 226. Assuming a pinhole optical model for left and right cameras 202, 204, images of the point P are projected onto left image sensor 214 and right image sensor 216 at points $x_l$ and $x_r$ respectively. Values $x_l$ and $x_r$ indicate distances from right and left optical axes 224, 226. The value $(x_l - x_r) = d$ is referred to as stereo disparity d. The stereo disparity d can be converted from pixel data to real world distance by multiplying times a scale factor s. The depth z can be determined from the stereo disparity d, the focal distance f, pixel scale s and baseline b by the equation:

$$z = \frac{f * b}{s * d} \quad (1)$$

In this example, the stereo pairs of images are displaced from each other only in the x-direction along the X axis, meaning that stereo disparity d is determined only along the X axis.

The depth z measurements from a pair of stereo images can be used to determine a pose for the stereo camera 200 using visual odometry. Visual odometry uses a set of depth z measurements from a pair of stereo images and camera intrinsic parameters to determine a pose of the stereo camera 200 with respect to a scene 206. Camera intrinsic parameters include camera focal distances in x and y directions, camera sensor scale in x and y directions, and the optical center of camera optics with respect to the sensor. Camera intrinsic parameters can be indicated in units of pixels, or in real world units. After depth estimates have been made and associated with pixels in the left camera 202 to form a depth image, the 3D data points can be projected into 3D space with the left camera intrinsic parameters to form a depth image.

Figure 3:
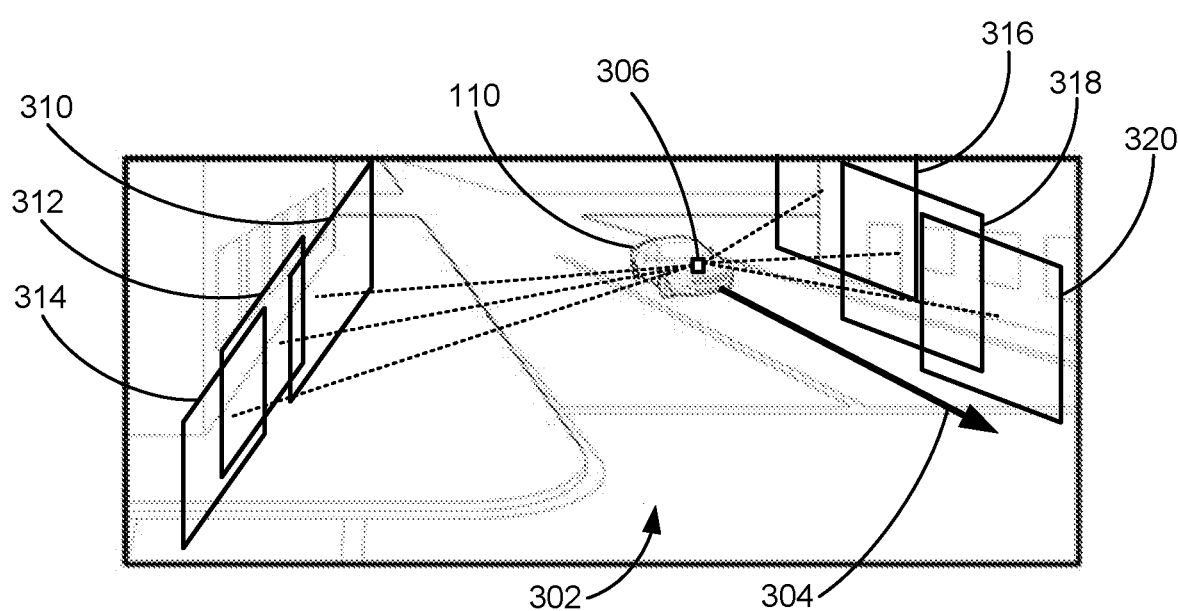
FIG. 3 is a diagram of an example scene including a vehicle.

FIG. 3 is a diagram of a scene 302. Scene 302 includes a vehicle 110 traveling through scene 302 on a route 304 indicated by an arrow. Vehicle 110 includes two cameras forming a single stereo camera 306 that acquires overlapping stereo image pairs 310, 312, 314, 316, 318, 320 of the scene 302 as a vehicle travels along a route 304. The overlapping stereo image pairs 310, 312, 314, 316, 318, 320 can be processed as described in relation to FIG. 2, above, to determine depth images based on locations of data points in scene 302.

Techniques for VPR for opposing viewpoints as described herein include first mapping a route by traveling the route in a first direction in a vehicle 110 equipped with one or more stereo cameras 200. The stereo cameras 200 acquire pairs of stereo images 310, 312, 314, 316, 318, 320 of scenes 302 along route 304. The pairs of stereo images are processed as described below in relation to FIGS. 4-6 to determine a reference descriptor database. A reference descriptor database is a database which includes descriptors, which are matrices which describe scenes 302 along a route 304, acquired as a vehicle 110 travels along the route 304 in a first direction. Techniques for VPR for opposing viewpoints as described herein permit a vehicle 110 traveling along the route 304 in the opposite direction from which the reference descriptor database was acquired to use the reference descriptor database to determine a real world location of a vehicle 110.

Figure 4:
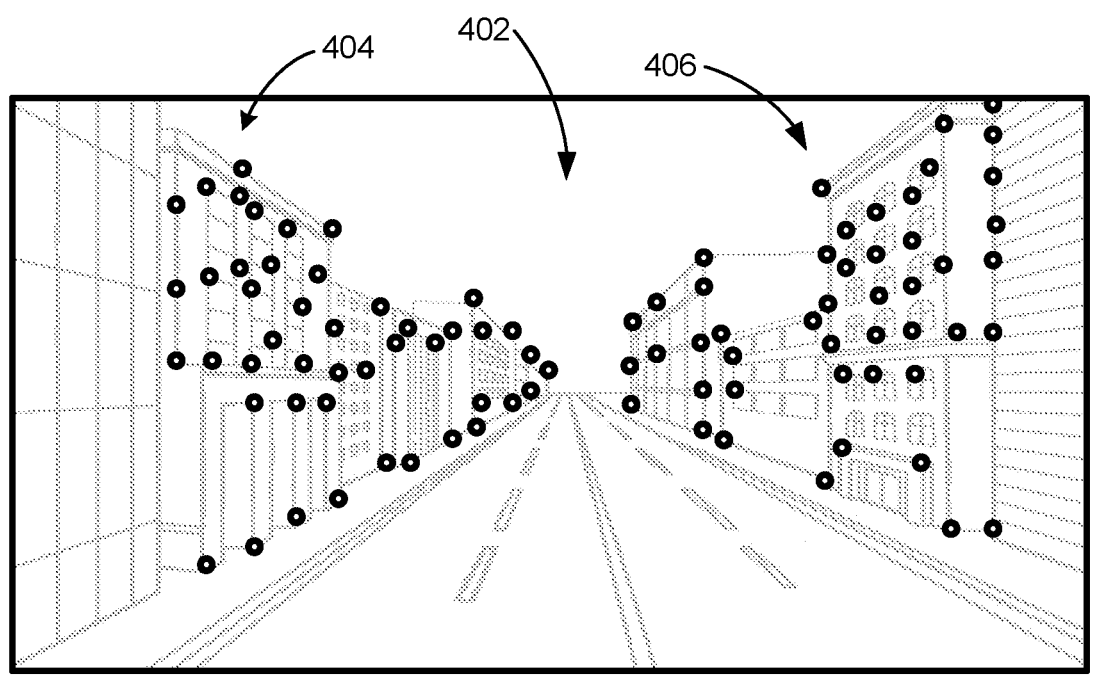
FIG. 4 is a diagram of an example scene including data points.

FIG. 4 is a diagram of a scene 402 illustrating data points 404, 406 determined by processing pairs of stereo images acquired by a vehicle 110 traveling in scene 402 with a stereo visual odometry software program as described in relation to FIG. 2. Stereo visual odometry software executes on a computing device 115 and outputs vehicle 110 poses and 3D location data for data points 404, 406. Data points 404, 406 can be acquired to describe features such as buildings, foliage, or structures such as bridges that are adjacent to a roadway and can be used by VPR for opposing viewpoints techniques described herein to determine a location of a vehicle 110 as it travels through scene 402 in the opposite direction from the direction scene 402 was traveled to acquire the data points 404, 406.

Figure 5:
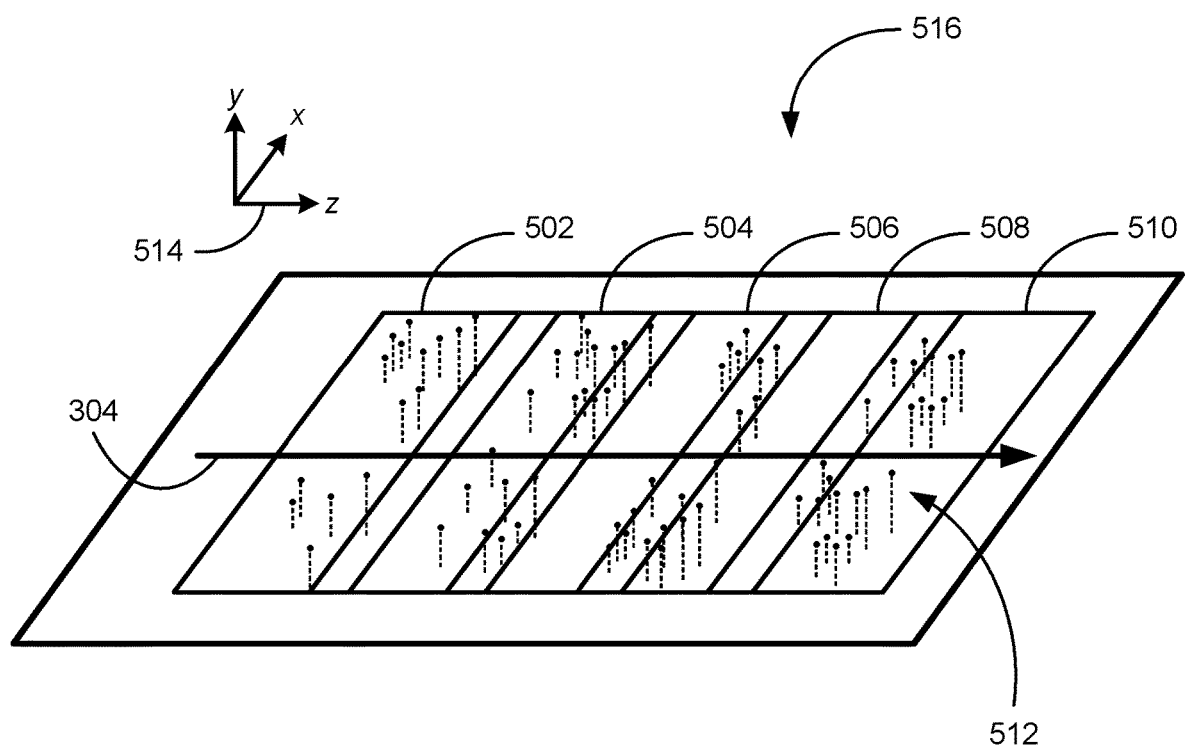
FIG. 5 is a diagram of example keyframe generation.

FIG. 5 is a diagram illustrating keyframe generation which accumulates the data points 404, 406 based on depth images output from the stereo visual odometry software. Keyframe generation rejects noisy data points 404, 406 and determines when a new overlapping keyframe 502, 504, 506, 508, 510 (individually and collectively keyframes 516) is to be created. The coordinate systems of the keyframes 516 are centered on the vehicle 110 and the keyframes 516 can overlap. Stereo triangulation error approximately increases with depth to the second power, so as an initial step to reject noisy data points 404, 406, pixels with a depth exceeding a user-selected threshold, rd, are discarded. Each depth image from the stereo visual odometry software has a pose estimate for the stereo camera. A pose estimate and the camera intrinsic and extrinsic parameters of the pair of stereo cameras is used to project each valid data point 404, 406 of the depth image into a common world frame. Common world frame refers to the frame of reference the visual odometry pose estimates are represented in. The common world frame is defined as the initial camera pose, including position and orientation (pose) indicated by the first image processed by the stereo visual odometry system.

Keyframes 516 are generated at a constant distance apart indicating equal displacements of the stereo cameras to aid subsequent matching with acquired data points 404, 406. Keyframes 516 can overlap while maintaining a constant distance apart. A path distance along a route 304 traveled by a vehicle 110 as it acquires data points 404, 406 is determined. The path distance is the sum of Euclidean distances between stereo visual odometry software position estimates since the last keyframe 516 was generated. When the path distance exceeds the desired descriptor spacing, s, a new keyframe 516 is generated to include a point cloud based on data points 404, 406 centered at the current vehicle pose.

To create a new keyframe point cloud, programming can be executed to transform the accumulated point cloud into the current camera frame and select all data points 404, 406 within a horizontal radius about the camera position, rk. Each time a new keyframe 516 is generated, distant data points 404, 406 in the accumulated point cloud data points 512 are eliminated using a second, larger horizontal radius, ra. A new keyframe 516 including point cloud data points 512 is not created until the path distance exceeds a threshold, e.g., 1.5rk, with the goal that the keyframe point cloud 512 will be well populated with data points 404, 406. Coordinate axes 514 indicate the x, y, and z directions, with z being in the direction of forward longitudinal motion of the vehicle 110 along the route 304, x being the direction lateral to the direction of motion of the vehicle 110, and y being the altitude of point cloud data points 512 measured with respect to the optical center of the camera 202 which is assumed to be perpendicular to the x, z ground plane. Point cloud data points indicate 3D positions in the current camera frame of reference.

During descriptor formation the height of the camera above the ground is added to the y coordinate of the points to compute the height of the points above the x, z ground plane. The height of the camera 200 above the x, z ground plane can be determined at the time the camera 200 is installed in the vehicle 110. Keyframes acquired while a stereo camera is traveling through a scene to determine a reference database are referred to herein as reference keyframes. Keyframes acquired by a stereo camera to locate the stereo camera with respect to a previously acquired reference database are referred to herein as current keyframes.

Figure 6:
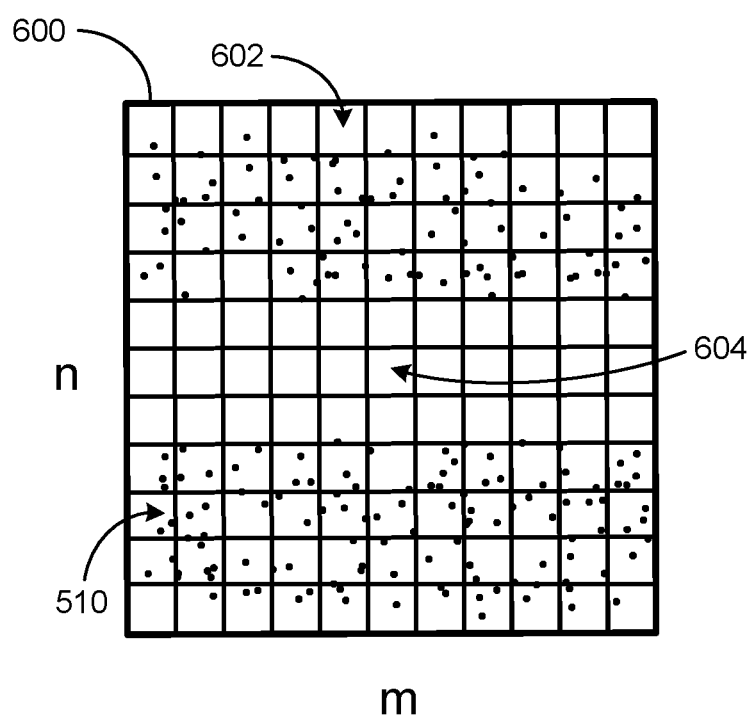
FIG. 6 is a diagram of an example descriptor.

FIG. 6 is a diagram of a descriptor 600. Descriptor 600 is an N×M matrix that describes a rectangular region along route 304, where the columns of the N×M matrix are parallel to the route 304 and the rows of the N×M matrix are perpendicular to the route 304. The point cloud data points 512 included in the rectangular areas indicated by the entries in the N×M matrix are represented by the largest value (highest) point cloud data point 512. For each keyframe 516 portion of point cloud data points 512, a descriptor 600 is formed. As the data points 404, 406 that form the point cloud data points 512 obtained through visual odometry as discussed above in relation to FIGS. 2 and 3 have absolute scale in real world coordinates, a descriptor 600 can be generated based on the keyframe 516 point cloud data points 512. The descriptor 600 is created from the keyframe 516 portion of point cloud data points 512 which occur in a 2rlo×2rla meter horizontal rectangle centered at the origin 604 of the camera frame, with the 2rlo meter side aligned with the longitudinal direction (or forward direction, z) and the 2rla meter side aligned with the lateral direction (x).

The rectangular domain centered at the origin 604 of the camera frame is divided into m equal-sized rows along the longitudinal axis and n equal-sized columns along the lateral axis to create bins 602. The maximum distance above a ground plane of the x, y, z data points 512 captured within each bin 602 determines the bin values for each of the m×n bins included in the m×n descriptor 600 matrix. If no data point 512 exists within a bin, the corresponding value in the descriptor 600 is set to zero. The height above the ground of a data point 512=[x, y, z] is computed as hp=hc−y, where hc is the known height of the left camera above the ground. To ensure the rectangular domain of the descriptor 600 is fully populated with points 512, the following relationships should be satisfied:

$$rd >= rlo \text{ and } rk >= r2lo + r2la \quad (2)$$

Where rd is the threshold for rejecting noisy data points 512 and rk is the horizontal radius within which data points 512 are acquired.

A route 304 can be traveled by a vehicle 110 that includes one or more stereo cameras 306 that acquire data points 404, 406 that can be processed using visual odometry to determine depth data and camera pose data that can be processed as described in relation to FIGS. 4-6 to determine multiple descriptors 600 that form a reference descriptor database that describes the scenes 302 along a route 304 as traveled in a first direction by a vehicle 110.

Figure 7:
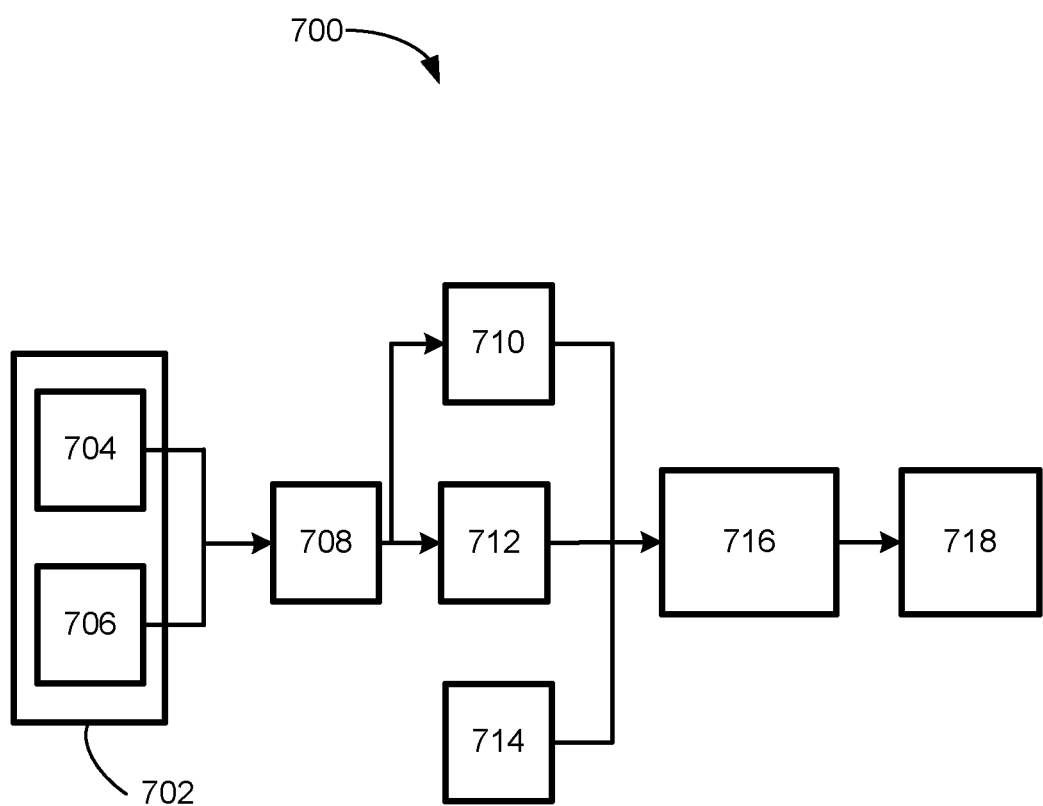
FIG. 7 is a diagram of an example visual place recognition (VPR) for opposing viewpoints system.

FIG. 7 is a diagram of a VPR for opposing viewpoints system 700 for obtaining a relative pose between a camera and a reference database. VPR for opposing viewpoints system is typically a software program that can execute on a computing device 115 included in a vehicle 110. VPR for opposing viewpoints system determines a location for a vehicle 110 as it travels on a route 304 that has been previously mapped by a vehicle 110 traveling on the same route 304 in the opposite direction. Mapping the route 304 includes determining a reference descriptor database by determining multiple descriptors 600 from stereo visual odometry data as described in relation to FIGS. 2-6, above.

VPR for opposing viewpoints system 700 begins by acquiring one or more pairs of stereo images with stereo camera 702, which includes a left camera 704 and a right camera 706. The pairs of stereo camera images are input to stereo visual odometry 708 to determine depth images 712 and poses 710 for the stereo camera 702. The depth images 712 and poses 710 along with a reference descriptor database are input to place recognition system 716. Place recognition system 716 generates a descriptor 600 based on the depth images 712 and poses 710 and uses the descriptor 600 to perform variable offset double descriptor 600 distance computation and double distance matrix sequence matching against the reference descriptor database as described below in relation to FIG. 8. Place recognition system 716 determines the descriptor 600 from the reference descriptor database with the lowest match score from double distance matrix sequence matching and selects it as the best matching location and outputs the best match descriptor 600 as the final match 718.

Figure 8:
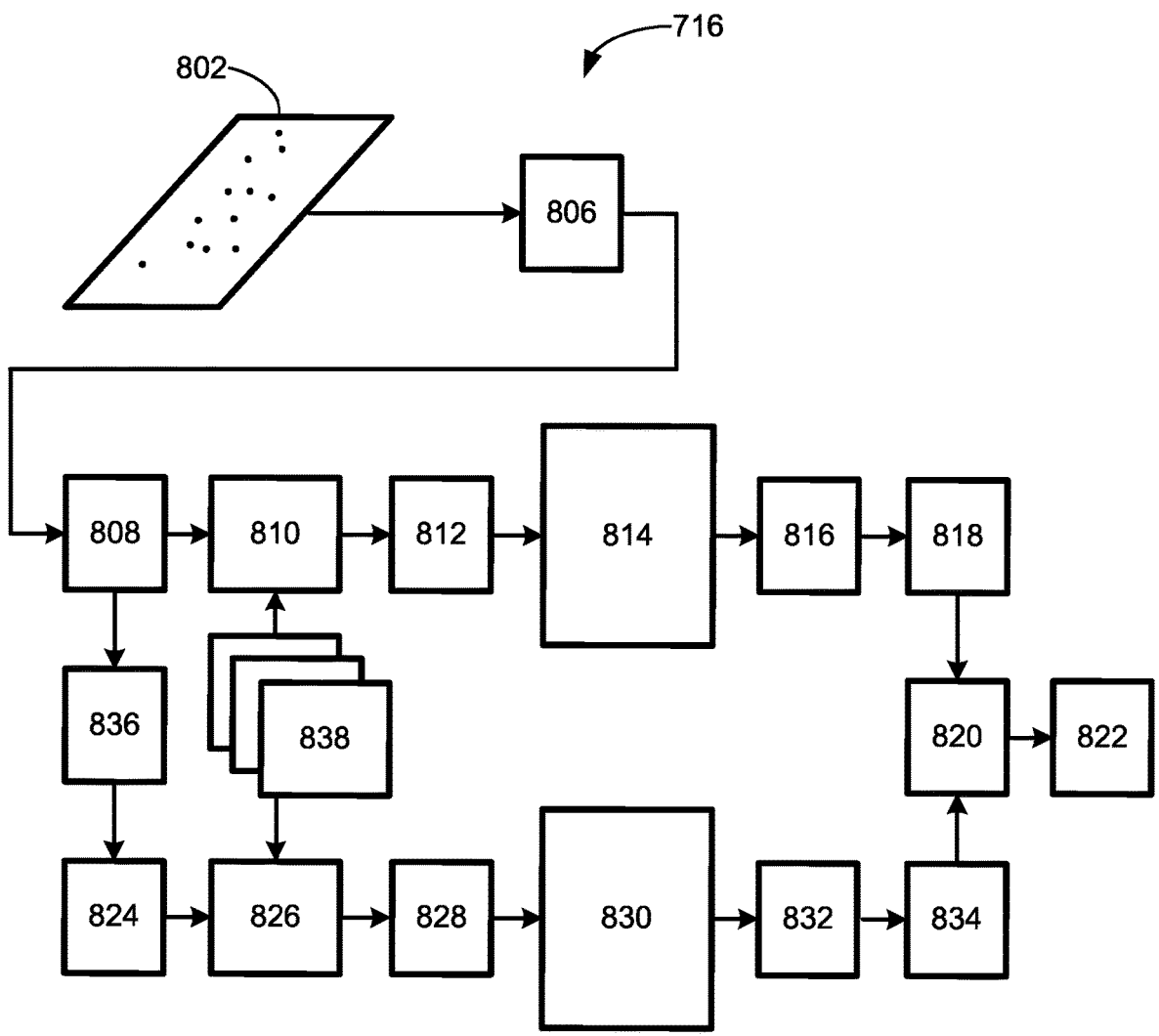
FIG. 8 is a diagram of an example place recognition system.

FIG. 8 is a diagram of a place recognition system 716, which can include a software program that can execute on a computing device 115 included in a vehicle 110. Place recognition system 716 can receive as input a current keyframe point cloud 802 generated by stereo visual odometry based on a depth image in a common world frame received by descriptor generator 806. Descriptor generator 806 generates a descriptor 600 as described above in relation to FIG. 6 based on the current keyframe point cloud 802. A similar viewpoint query matrix 808 is then determined by arranging the descriptor 600 data in columns that are parallel to the direction of motion of the stereo camera and rows that are perpendicular to the direction of motion of the stereo camera. The similar viewpoint query matrix 808 is passed onto the double-flip processor 836 which performs a double-flip on the rows and columns of the similar viewpoint query matrix 808 by flipping the similar viewpoint query matrix 808 laterally and longitudinally by exchanging opposing rows and columns of the similar viewpoint query matrix 808 to form an opposing viewpoint query matrix 824. This has the effect of generating an opposing viewpoint query matrix 824 that appears as if it was generated by a vehicle 110 traveling the route 304 in the same direction as the vehicle 110 that generated the reference descriptor database.

The similar viewpoint query matrix 808 and opposing viewpoint query matrix 824 include bins (i.e., metadata) at each row and column location that include the value of the maximum height data point in the current keyframe point cloud data points 512 included in the x, z addresses indicated by the bin. At similar descriptor distance computation 810 and opposing descriptor distance computation 826, descriptors 600 included in the similar viewpoint query matrix 808 and the opposing viewpoint query matrix 824 are compared to descriptors 600 from the reference descriptor database 838 to form similar view distance matrix columns 812 and opposing view distance matrix columns 828, respectively. By comparing the values of bins included in the similar viewpoint query matrix 808 and opposing viewpoint query matrix 824 with bins included in the descriptors 600 included in the reference descriptor database 838.

Similar viewpoint distance matrix 814 and opposing viewpoint distance matrix 830 can be determined by calculating individual distances. Let $Q \in R$, m×n be a query descriptor 600 matrix, and $R \in R$, m×n be the descriptor 600 matrix from the reference descriptor database 838. Additionally, let $Q[i, j, h, w]$ denote the submatrix obtained by selecting the rows $\{i, \ldots, i+h-1\}$ and columns $\{j, \ldots j+w-1\}$ from Q. The descriptor 600 distance between Q and R is then computed as:

$$d(Q, R) = \min\{k \in slo, l \in sla\} \operatorname{cd}(Q[iQ, jQ, h, w], R[iR, jR, h, w]) \quad (3)$$

Where $$iQ = \max(1, -k+1), jQ = \max(1, -l+1) \quad (4)$$

$$iR = \max(1, k+1), jR = \max(1, l+1) \quad (5)$$

and $$h = m - |k|, w = n - |l| \quad (6)$$

where slo and sla are sets of longitudinal and lateral shifts, respectively, and cd(A, B) is the cosine distance between matrices A and B defined by:

$$\operatorname{cd}(A, B) = 1 - (a \cdot b)/(\|a\|\|b\|) \quad (7)$$

Where a and b are vectors obtained by flattening matrices A and B, respectively. The similar view distance matrix columns 812 and opposing view distance matrix columns 828 are output and collected into similar viewpoint distance matrix 814 and opposing viewpoint distance matrix 830, respectively.

Figure 9:
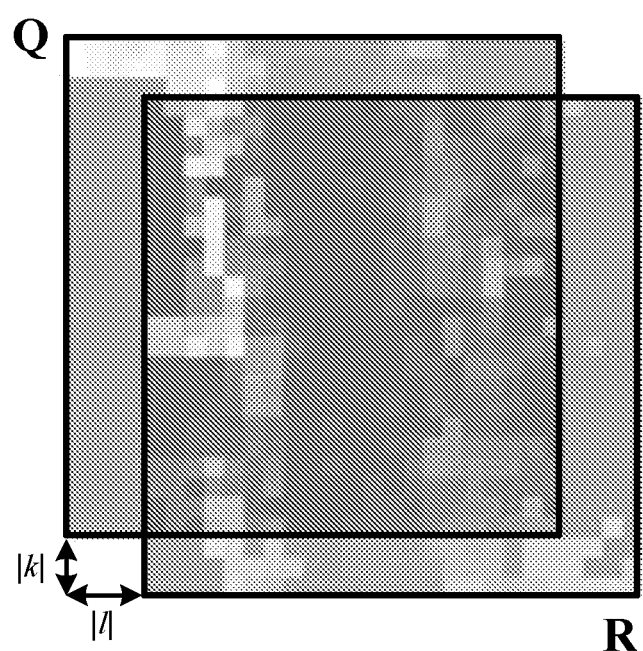
FIG. 9 is a diagram of example matrix overlap.

FIG. 9 is a diagram that illustrates an overlapping region between matrices Q and R where the cosine distance is applied to for a single longitudinal and lateral shift to produce similar viewpoint distance matrix 814 and opposing viewpoint distance matrix 830. Determining descriptor distance as described above is invariant with respect to horizontal shifts, but not to rotations. The opposing viewpoint case is accounted for by double-flipping the reference descriptors 600, i.e., one flip about each axis. The double-flip descriptor 600 yields a descriptor 600 similar to that which would have been produced from the opposing view. The double-flip is performed on the query descriptor 600 rather than the reference descriptors 600 to prevent either doubling the reference database size or requiring that the references be double-flipped for each new query. For efficiency, computations across separate reference descriptors 600 can be performed in parallel.

Returning to FIG. 8, the distances computed on similar viewpoint distance matrix (Dsim) 814 and opposing viewpoint distance matrix (Dopp) 830 are received by sequence matching 816, 832, respectively. The descriptor distances computed with the original query contribute to a distance matrix that captures similar viewpoint Dsim 814, while those computed with the double-flipped query contribute to a distance matrix that captures opposing viewpoint Dopp 830. A sequence of similar viewpoint matches can be expected to appear as a line with positive slope in similar viewpoint Dsim 814 and to produce no pattern in opposing viewpoint Dopp 830. Conversely, a sequence of opposing viewpoint matches can be expected to appear as a line with negative slope in opposing viewpoint Dopp 830 and to produce no pattern in similar viewpoint Dsim 814. Additionally, the descriptor 600 formation described above will ensure a slope magnitude roughly equal to 1 in either case.

To predict the correct match without any a priori knowledge regarding viewpoint, sequence matching 816, 832 is performed separately within each distance matrix Dsim 814, Dopp 830. For example, over the last w queries sequence matching 816 can be performed on similar viewpoint Dsim 814 with positive slopes and sequence matching 832 on opposing viewpoint Dopp 830 with negative slopes. Sequence matching 816, 832 processes output sequence matches 818, 834, respectively.

In each example, we evaluate slopes in the distance matrices 814, 830 with magnitudes ranging from vmin to vmax, where vmin is slightly less than 1 and vmax is slightly greater than 1, for example vmin=0.9 and vmax=1.1. For efficiency, sums over multiple candidates can be computed in parallel. Each of the two searches returns a predicted match for the query at the center of the search window along with a score. The matches 818, 834 are compared at match compare 820 and the match with the lowest score is output at match output 822. The best match output at match output 822 indicates the best descriptor 600 from the reference descriptor database 838. The lateral and longitudinal shifts used to form the best match are combined with the real world location of the best match descriptor 600 included in the reference descriptor database 838 and the vehicle 110 pose from the descriptor 600 used to form the similar viewpoint query matrix 808 and the opposing viewpoint query matrix 824 to determine a best estimate of vehicle pose.

Figure 10:
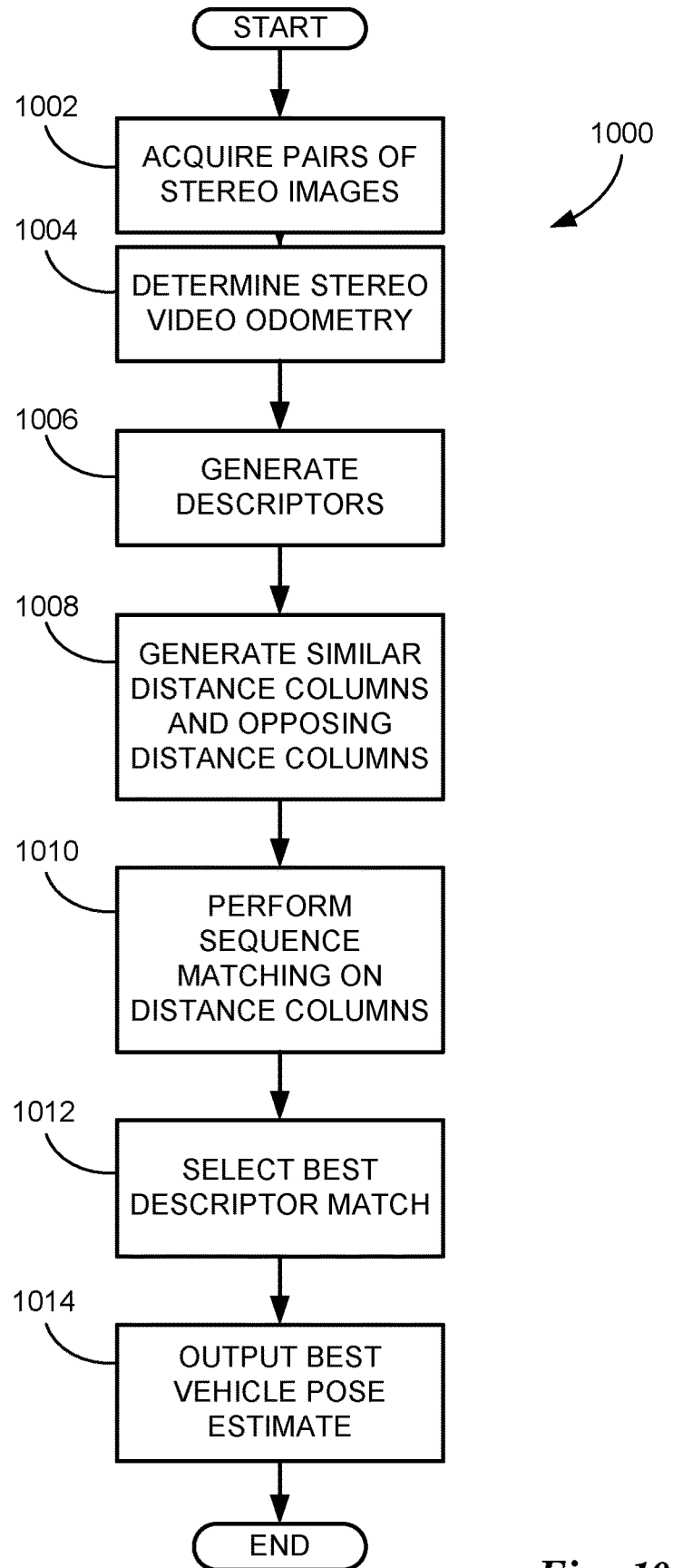
FIG. 10 is a flowchart diagram of an example process for performing VPR for opposing viewpoints.

FIG. 10 is a flowchart of a process 1000 for performing VPR for opposing viewpoints. Process 1000 can be implemented in a computing device 115 in a vehicle 110, for example. Process 1000 includes multiple blocks that can be executed in the illustrated order. Process 1000 could alternatively or additionally include fewer blocks or can include the blocks executed in different orders.

Process 1000 begins at block 1002, where one or more stereo cameras 702 included in a vehicle 110 acquire one or more pairs of stereo images from a scene 302, 402 as the vehicle 110 travels on a route 304 in the opposite direction from a vehicle 110 that previously traveled the route 304 to acquire a reference descriptor database 714 based on reference keyframes that describes locations in the scene.

At block 1004 the one or more pairs of stereo images are received by stereo visual odometry 708 to determine depth images 712 in a scene 302, 402. Depth images 712 and stereo camera pose 710 including intrinsic and extrinsic camera parameters are combined to form point clouds in a common world frame.

At block 1006, place recognition system 716 generates a descriptor 600 based on the current keyframe point cloud 802 and determines descriptors 600 including a similar viewpoint query matrix 808 and an opposing viewpoint query matrix 824.

At block 1008 the similar viewpoint query matrix 808 and the opposing viewpoint query matrix 824 are compared to descriptors 600 from the reference descriptor database 838 to form similar view distance matrix columns 812 and opposing view distance matrix columns 828 which contribute to a similar view distance matrix 814 and opposing view distance matrix 830, respectively.

At block 1010 place recognition system 716 performs sequence matching as described above in relation to FIG. 7 on the similar view distance matrix 814 and opposing view distance matrix 830 to determine how well descriptors 600 from the reference database 838 match\ the similar view query matrix 808 and opposing view query matrix 824. Sequences of values in the similar view distance matrix 814 and opposing view distance matrix 830 are processed by sequence matching to determine the sequences of values that yield the best match with lines having slopes of approximately +/−1.

At block 1012 matches 818, 834 output by sequence matching 816, 832 are compared at match compare 820 to determine which match has the lowest value to be output at match output 822.

At block 1014 the best estimated vehicle pose is determined based on the best matched location in the reference descriptor database 838 the lateral and longitudinal offsets of the best match descriptor 600 and output. Following block 1014 process 1000 ends.

Figure 11:
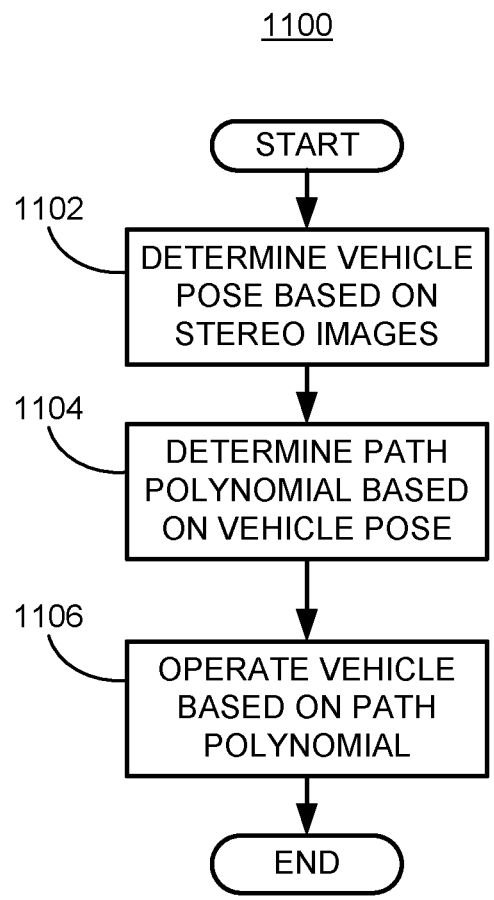
FIG. 11 is a flowchart diagram of an example process for operating a vehicle based on determining a vehicle pose based on VPR for opposing viewpoints.

FIG. 11 is a flowchart of a process 1100 for operating a vehicle 110 based on a best estimate of vehicle pose based on VPR for opposing viewpoints. Process 1100 is described in terms of operating a vehicle 110 as a non-limiting example. This example describes VPR for opposing viewpoints applied to a multi-session reference database 838 which includes georeferencing as described above. VPR for opposing viewpoints can also be applied to in-session reference databases 838 with or without georeferencing. In examples where georeferencing is not included in the reference database 838, a separate process can be used to obtain real world coordinates. Process 1100 can be applied more generally to moving systems. For example, process 1100 can provide high-resolution pose data to mobile systems such as mobile robots and drones. Process 1100 can also be applied to systems that include moving components, such as stationary robots, package sorting systems, and security systems. Process 1100 can be implemented by computing device 115 included in vehicle 110. Process 1100 includes multiple blocks that can be executed in the illustrated order. Process 1100 could alternatively or additionally include fewer blocks or can include the blocks executed in different orders.

Process 1100 begins at block 1102, where a computing device 115 in a vehicle 110 determines a vehicle pose based on pairs of stereo images and a reference descriptor database 838. The reference descriptor database 838 can be generated by a vehicle 110 traveling in a first direction on a route 304 and the pairs of stereo images can be generated by a vehicle 110 traveling in the opposite direction as was traveled by the vehicle 110 that generated the reference descriptor database 838 as described above in relation to FIGS. 2-9.

At block 1104 computing device 115 determines a path polynomial that directs vehicle motion from a current location based on the determined vehicle pose. As will be understood, vehicle 110 can be operated by determining a path polynomial function which maintains minimum and maximum limits on lateral and longitudinal accelerations, for example.

At block 1106 computing device 115 operates vehicle 110 based on the determined path polynomial by transmitting commands to controllers 112, 113, 114 to control one or more of vehicle propulsion, steering and brakes according to a suitable algorithm. In one or more examples, data based on the path polynomial can alternatively or additionally be transmitted to a human machine interface, e.g., in a vehicle 110, such as a display. Following block 1106 process 1100 ends.

Computing devices such as those described herein generally each includes commands executable by one or more computing devices such as those identified above, and for carrying out blocks or steps of processes described above. For example, process blocks described above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising:
a computer that includes a processor and a memory, the memory including instructions executable by the processor to:
generate a current keyframe point cloud based on pairs of stereo images while a stereo camera travels through a scene;
determine a similar viewpoint query matrix and an opposing viewpoint query matrix based on the current keyframe point cloud wherein the opposing viewpoint query matrix is determined by flipping the similar viewpoint query matrix laterally and longitudinally by exchanging opposing rows and columns of the similar viewpoint query matrix;
generate a distance matrix and an opposing view distance matrix by comparing the similar viewpoint query matrix and the opposing viewpoint query matrix to reference matrices; and
determine a relative pose between a stereo camera and a reference to determine a location in the scene during travel of the stereo camera through the scene by performing sequence matching in the distance matrix and the opposing view distance matrix to determine a minimum sequence.

2. The system of claim 1, the instructions including further instructions to generate the keyframe point cloud based on the pairs of stereo images by projecting pixel data from the pairs of stereo images into the keyframe point cloud based on a pose estimate for the stereo camera and camera intrinsic parameters from one or more of a left or right camera of the stereo camera.

3. The system of claim 1, the instructions including further instructions to determine the similar viewpoint query matrix and the opposing viewpoint query matrix based on data points included in the current keyframe point cloud and distances above a ground plane of the data points.

4. The system of claim 1, wherein the similar viewpoint query matrix is arranged in columns that are parallel to a direction of motion of the stereo camera and rows that are perpendicular to the direction of motion of the stereo camera.

5. The system of claim 1, the instructions including further instructions to compare the similar viewpoint query matrix and the opposing viewpoint query matrix to the reference matrices to generate similar view distance matrix columns and opposing view distance matrix columns by shifting the similar viewpoint query matrix and the opposing viewpoint query matrix laterally and longitudinally with respect to the reference matrices and comparing overlapping bin values.

6. The system of claim 5, the instructions including further instructions to perform sequence matching on the similar view distance matrix columns and the opposing view distance matrix columns by searching for diagonals that include minimum values that indicate matches.

7. The system of claim 1, the instructions including further instructions to generate reference keyframes by traveling in the scene in a first direction while acquiring pairs of stereo images and generating the reference keyframes at equal displacements of the stereo camera.

8. The system of claim 1, the instructions including further instructions to determine a real world location in the scene determined during the travel of the stereo camera through the scene based on a georeferenced reference database.

9. The system of claim 1, the instructions including further instructions to operate a vehicle based on the location in the scene by determining a path polynomial.

10. The system of claim 5, wherein the bin values are a maximum distance above a ground plane.

11. A method, comprising:
generating a current keyframe point cloud based on pairs of stereo images while a stereo camera travels through a scene;
determining a similar viewpoint query matrix and an opposing viewpoint query matrix based on the current keyframe point cloud;

generating a distance matrix and an opposing view distance matrix by comparing the similar viewpoint query matrix and the opposing viewpoint query matrix to reference matrices wherein the opposing viewpoint query matrix is determined by flipping the similar viewpoint query matrix laterally and longitudinally by exchanging opposing rows and columns of the similar viewpoint query matrix; and determining a relative pose between a stereo camera and a reference to determine a location in the scene during travel of the stereo camera through the scene by performing sequence matching in the distance matrix and the opposing view distance matrix to determine a minimum sequence.

12. The method of claim 11, further comprising generating the keyframe point cloud based on the pairs of stereo images by projecting pixel data from the pairs of stereo images into the keyframe point cloud based on a pose estimate for the stereo camera and camera intrinsic parameters from one or more of a left or right camera of the stereo camera.

13. The method of claim 11, further comprising determining the similar viewpoint query matrix and the opposing viewpoint query matrix based on data points included in the current keyframe point cloud and distances above a ground plane of the data points.

14. The method of claim 11, wherein the similar viewpoint query matrix is arranged in columns that are parallel to a direction of motion of the stereo camera and rows that are perpendicular to the direction of motion of the stereo camera.

15. The method of claim 11, further comprising comparing the similar viewpoint query matrix and the opposing viewpoint query matrix to the reference matrices to generate similar view distance matrix columns and opposing view distance matrix columns by shifting the similar viewpoint query matrix and the opposing viewpoint query matrix laterally and longitudinally with respect to the reference matrices and comparing overlapping bin values.

16. The method of claim 15, further comprising performing sequence matching on the similar view distance matrix columns and the opposing view distance matrix columns by searching for diagonals that include minimum values that indicate matches.

17. The method of claim 11, further comprising generating reference keyframes by traveling in the scene in a first direction while acquiring pairs of stereo images and generating the reference keyframes at equal displacements of the stereo camera.

18. The method of claim 11, further comprising determining a real world location in the scene determined during the travel of the stereo camera through the scene based on a georeferenced reference database.

19. The method of claim 11, further comprising operating a vehicle based on the location in the scene by determining a path polynomial.

20. The method of claim 15, wherein the bin values are a maximum distance above a ground plane.

* * * * *